(12) United States Patent
Ruetschi et al.

(10) Patent No.: US 9,007,894 B2
(45) Date of Patent: Apr. 14, 2015

(54) METHOD, DEVICE, AND SYSTEM FOR PROVIDING A SURVIVABILITY GATEWAY SERVICE

(75) Inventors: Johannes Ruetschi, Boca Raton, FL (US); Geert Fieremans, Boca Raton, FL (US)

(73) Assignee: Unify GmbH & Co., KG, Munich (DE)

( * ) Notice: Subject to any disclaimer, the term of this patent is extended or adjusted under 35 U.S.C. 154(b) by 200 days.

(21) Appl. No.: 13/876,878

(22) PCT Filed: Jul. 10, 2012

(86) PCT No.: PCT/US2012/046048
§ 371 (c)(1),
(2), (4) Date: Mar. 29, 2013

(87) PCT Pub. No.: WO2014/011155
PCT Pub. Date: Jan. 16, 2014

(65) Prior Publication Data
US 2014/0016455 A1   Jan. 16, 2014

(51) Int. Cl.
*H04L 12/24* (2006.01)
*H04L 29/08* (2006.01)
*H04L 29/14* (2006.01)

(52) U.S. Cl.
CPC ........ *H04L 41/0668* (2013.01); *H04L 67/2861* (2013.01); *H04L 69/40* (2013.01); *H04L 29/14* (2013.01)

(58) Field of Classification Search
CPC . H04L 41/0668; H04L 67/2861; H04L 29/14; H04L 69/40
USPC ........ 370/220, 217, 218, 235, 236, 242, 244, 370/252
See application file for complete search history.

(56) References Cited

U.S. PATENT DOCUMENTS 8,325,617 B2 * 12/2012 Ruetschi et al. ............. 370/252
2001/0039574 A1   11/2001 Cowan
(Continued)

FOREIGN PATENT DOCUMENTS

EP   2106065 A2   9/2009
EP   2111016 A1   10/2009
(Continued)

OTHER PUBLICATIONS

International Search Report for PCT/US2012/046048 dated Oct. 1, 2012.
(Continued)

*Primary Examiner* — Brian D Nguyen
(74) *Attorney, Agent, or Firm* — Buchanan Ingersoll & Rooney PC

(57) ABSTRACT

A method and apparatus dynamically pair a user's communication devices with a personal survivability gateway. The gateway can support the establishment of communication services in case of a network failure between a site where the user's communication devices are located and the site that provides the user's communication services. Preferably, the survivability gateway is configured so that if a network failure occurs, the user does not experience service degradation, or at least significant service degradation. For instance, the user's inbound and outbound communications during such an outage may be routed through his personal survivability gateway and a survivability proxy to limit, if not eliminate such service degradation.

25 Claims, 7 Drawing Sheets

(56) References Cited

U.S. PATENT DOCUMENTS

| | | |
|---|---|---|
| 2006/0077955 A1 | 4/2006 | Poustchi et al. |
| 2007/0047571 A1* | 3/2007 | Kandikonda et al. ......... 370/449 |
| 2008/0013447 A1 | 1/2008 | Lauber |
| 2009/0245492 A1* | 10/2009 | Baker et al. .............. 379/112.01 |
| 2010/0070563 A1* | 3/2010 | Baker et al. ................... 709/203 |
| 2010/0161745 A1* | 6/2010 | Yamazaki et al. ............ 709/206 |
| 2010/0246384 A1* | 9/2010 | Bullappa ....................... 370/221 |
| 2011/0299387 A1* | 12/2011 | Eydelman et al. ............ 370/225 |

FOREIGN PATENT DOCUMENTS

| | | |
|---|---|---|
| RU | 2407195 C2 | 12/2010 |
| WO | 2006/037232 RU | 4/2006 |

OTHER PUBLICATIONS

Written Opinion of the International Searching Authority for PCT/US2012/046048 dated Oct. 1, 2012.

\* cited by examiner

```
┌─────────────────────────────────────────────────────────────────────────┐
│ Communication device sends authorization message to communication server. │
└─────────────────────────────────────────────────────────────────────────┘
                                      ↓
┌─────────────────────────────────────────────────────────────────────────┐
│ Communication server receives the authorization message and determines a best │
│ survivability proxy for the device. The communication server then sends a response │
│ to the communication device assigning a survivability proxy device to the │
│ communication device. The survivability proxy device may be another │
│ communication device or a communication terminal that is associated with the user │
│ of the communication device or may be a survivability server or access point that │
│ also has survivability server functionality. │
└─────────────────────────────────────────────────────────────────────────┘
                                      ↓
┌─────────────────────────────────────────────────────────────────────────┐
│ The communication device registers with the communication server and/or with the │
│ assigned proxy device. If the communication device only registers with the assigned │
│ proxy device, the proxy device sends a registration message to the communication │
│ server for the communication device. Thereafter, the communication server utilizes │
│ a transmission path for sending and receiving messages from the communication │
│ device that passes through a first network. │
└─────────────────────────────────────────────────────────────────────────┘
                                      ↓
┌─────────────────────────────────────────────────────────────────────────┐
│ A communication terminal having survivability gateway functionality registers with │
│ the communication server using information indicating the user of the │
│ communication terminal is also the user of the communication device. The │
│ communication server then assigns the terminal as the survivability gateway for the │
│ communication device. │
└─────────────────────────────────────────────────────────────────────────┘
                                      ↓
┌─────────────────────────────────────────────────────────────────────────┐
│ The assigned proxy device detects a failure of the first network through which │
│ communication messages between the communication device and communication │
│ server are exchanged per registration bindings established during the │
│ communication device registration process used with the communication server │
│ and sends a survivability notification to at least one of the communication device │
│ and a survivability gateway. │
└─────────────────────────────────────────────────────────────────────────┘
                                      ↓
┌─────────────────────────────────────────────────────────────────────────┐
│ The proxy device or survivability gateway sends a survivability registration │
│ message to the communication server to have the registration bindings temporarily │
│ replaced utilizing a second transmission path that passes through a second network. │
└─────────────────────────────────────────────────────────────────────────┘
                                      ↓
┌─────────────────────────────────────────────────────────────────────────┐
│ The communication server replaces the registration bindings so that it sends │
│ messages to the communication device and receives messages from the │
│ communication device via the second transmission path. │
└─────────────────────────────────────────────────────────────────────────┘
```

FIGURE 6

METHOD, DEVICE, AND SYSTEM FOR PROVIDING A SURVIVABILITY GATEWAY SERVICE

CROSS-REFERENCE TO RELATED APPLICATIONS

This application is the United States national phase under 35 U.S.C. §371 of International Patent Application No. PCT/US2012/046048, filed on Jul. 10, 2012.

FIELD OF INVENTION

The present invention relates to communication systems, such as communication systems that utilize cellular phones, mobile computer devices, tablets, laptops, or other terminal devices. More particularly, the present invention relates to a system, method and device configured to permit a terminal device such as a mobile phone, tablet or laptop to utilize or provide a survivability service so that a user's devices may obtain network access in the event of a network node failure or network outage that affects the user's ability to utilize communications via a network.

BACKGROUND OF THE INVENTION

Survivability services may be provided to communication devices that experience a network service outage. Such an outage may occur due to a node failure or damage to a transmission line over which communication messages sent by communication devices travel.

Survivability services often require hardware elements that need to be maintained and serviced. Such services therefore often incur costs in terms of the hardware and maintenance. Further, such services may only provide a limited number of mobility options or not provide for device mobility. For example, typically infrastructure must be employed such as analog, Session Initiation Protocol ("SIP") gateways or Time-division multiplexing ("TDM") gateways at a survivability site that must undergo administration and maintenance to remain able to provide the service. Additionally, usually statically provisioned circuits must be provided for permitting communications to travel between the different terminal devices receiving the survivability service and the survivability gateways. Such circuits also need to be maintained and incur a cost in terms of a capital cost for installation as well as operating costs associated with maintaining those circuits.

In addition to costs, such survivability services may be rendered at a reduced level of service. For instance, the transmission quality or transmission capacity of the survivability gateways may be limited as compared to typical network service.

A new survivability service is needed that permits survivability services to be provided more efficiently. Preferably such a service also does not result in degradation or at least a significant degradation in services during a network outage.

SUMMARY OF THE INVENTION

A communication system includes a first communication device, a communication server hosting a communication service, a first network communicatively connectable to the communication server and a second network communicatively connectable to the communication server. The first communication device is communicatively connectable to the communication server to utilize the server via a first transmission path that passes through the second network. A survivability proxy device is communicatively connectable to the server, the second network and the first communication device. The first communication device registers with at least one of the survivability proxy device and the communication server so that the first communication device utilizes the communication service hosted by the communication server by exchanging communications with the communication server via a first transmission path that traverses the second network. The survivability proxy device determines that the second network experienced a failure so that the first communication device is unable to utilize the second network for utilization of the communication service hosted by the communication server. The survivability proxy sends a survivability notification to at least one of the first communication device and a survivability gateway device assigned to the first communication device. One of the survivability proxy device and the survivability gateway device sends a survivability registration message to the communication server via a second transmission path that traverses the first network. In response to receipt of the survivability registration message, the communication server replaces an initial route set for the first communication devices that defines an initial route path comprising the first transmission path along which the communication server sends communications to the first communication device with a survivability route set identified by the received survivability registration message that defines a survivability route path comprised of the second transmission path.

After the initial route set is replaced with the survivability route set, the communication server may send messages to the first communication device via the second transmission path and also receive messages from the first communication device via the second transmission path. The communication server may use the survivability route set until it determines that the failure of the second network is resolved or until the first communication device registers via the first communication path. In one alternative, the survivability route set may be utilized until the first communication device re-registers with the communication server to utilize the service or the communication service receives a message from the survivability proxy device or survivability gateway device indicating the failure of the second network was resolved and that the communication server may resume use of the initial route set.

The communication server may be a computer device such as a SIP server or other server. The first communication device may be a communication endpoint such as a laptop computer, desktop computer, internet appliance, cellular phone, smart phone, PC telephone, tablet or personal digital assistant. The survivability gateway device may be a communication terminal such as a tablet, smart phone, or laptop computer. The survivability proxy may be a computer device such as s server, SIP proxy workstation or other computer device.

In one embodiment of the system, the failure of the second network may create a change in a status of service or quality of service associated with the communication service to be below a predetermined threshold value. For instance, the failure could be due to a failure of at least one node of the second network that prevents any transmission of any data between the first communication device and the communication server. As another example, the failure could be due to an unusually high traffic experienced by one or more nodes of the second network that delays or interrupts the communication service for a predetermined period of time such that the quality of service for the service hosted by the communication server is at an undesirable level or is unable to support the service for communications exchanged with the first communication device.

In one embodiment, the survivability proxy device may be a communication terminal that is associated with a user who is also associated with the first communication device. The communication terminal may be communicatively connectable to the first network to communicate with the communication server via the second communication path. The communication terminal may be the survivability gateway device. The communication terminal may also be communicatively connectable to the survivability proxy device.

In one embodiment, the survivability proxy device may be a communication terminal associated with a user of the first communication device that includes a processing unit communicatively coupled to at least one transceiver unit and a non-transitory memory. The communication terminal may be a survivability gateway for the first communication device after the failure of the second network is determined to have occurred such that the survivability proxy device also provides a survivability gateway function.

In one embodiment of the system, the first network is a cellular network and the second network is a LAN or WAN. The cellular network may be a cellular network provided by a cellular service provider for example, and the LAN or WAN may be an enterprise network maintained by a business or other entity that has a service arrangement with the cellular service provider. In the event the enterprise network experienced a failure, use of the cellular service provider's network can therefore permit utilization of a service hosted by an enterprise device connectable to both networks such as the communication server.

When the survivability gateway device is utilized, it may receive a communication session related message from the communication server via the send transmission path after a failure of the second network is detected. The survivability gateway device may then forward that communication session related message to the survivability proxy device and that proxy device may then forward that message to the first communication device. In an alternative embodiment of the system, the survivability proxy device may receive a communication session related message from the communication server and forward that message directly to the first communication device.

The survivability gateway device may be assigned to the first communication device and receive the survivability notification from the survivability proxy device. The survivability gateway device may be a communication terminal for instance. Prior to the survivability proxy device determining that the second network experienced the failure it may register with the communication server via exchanging one or more messages with the communication server via the second network, which may be a wide area network or local area network. The communication server may then assign the communication terminal as a survivability gateway for the first communication device by determining that the communication terminal has a survivability gateway functionality and determining that a user of the communication terminal that is also associated with the first communication device and then subsequently sending a message to the survivability proxy device to inform that device that the communication terminal is the survivability gateway device for the first communication device. The sent message may identify the terminal as the survivability gateway for the first communication device, for example.

A method for providing a survivability service for a communication service is also provided. The method includes the steps of a first communication device registering with at least one of a survivability proxy device and a communication server so that the first communication device can utilize a communication service hosted by the communication server by exchanging communications with the server via a first transmission path that traverses a first network. The survivability proxy device determines that the first network experienced a failure so that the first communication device is unable to utilize the first network to utilize the service hosted by the communication server. The survivability proxy device then sends a survivability notification to at least one of the first communication device and a survivability gateway device assigned to the first communication device. The survivability proxy device or the survivability gateway device sends a survivability registration message to the communication server via a second transmission path that traverses a second network. In response to receipt of the survivability registration message, the server replaces an initial route set for the first communication device that defines an initial route path that includes the first transmission path along which the server sends communications to the first communication device with a survivability route set identified by the received survivability message that defines a survivability route path that includes the second transmission path.

In some embodiments of the method, a communication terminal may be the survivability proxy device that also functions as a survivability gateway. In other embodiments, the survivability gateway device may be a communication terminal that is utilized. The communication terminal may communicate with the survivability proxy device and the communication server.

In one embodiment of the method, the method also includes the survivability gateway receiving a communication session related message from the communication server via the second transmission path that is for receipt by the first communication device. The survivability gateway device may then forward that message to the survivability proxy device, which may then forward or directly forward that message to the first communication device. In other embodiments of the method, the survivability proxy device may receive a communication session related message from the communication server via the second transmission path and may then forward or directly forward that message to the first communication device.

In some embodiments of the method, the survivability gateway device may be a communication terminal assigned to the first communication device that receives the survivability notification. Prior to the survivability proxy device determining that the first network experienced the failure, the communication terminal may register with the communication server via exchanging at least one message with the server via the first network. The communication server may determine either during registration or thereafter that the communication terminal has survivability gateway functionality and that a user associated with the communication terminal is also associated with the first communication device. The communication server may then assign the terminal to the first communication device as a survivability gateway for the first communication device and send a message to the survivability proxy device via the first network identifying the communication terminal as the survivability gateway for the first communication device so that the survivability proxy device sends the survivability notification to the survivability gateway device after determining that the first network experienced the failure.

A non-transitory computer readable medium is also disclosed. The medium may have an application stored thereon that includes program code executable by a communication terminal. The code may define a method that is executed by the terminal when it executes the program code. The method may include the step of one of: (a) the communication terminal determining a failure of a first network occurred that affects the use of a first transmission path along which communications are exchanged between a communication server that hosts a service and a first communication device and (b) the communication terminal receiving a survivability notification indicating that the failure of the first network occurred that affects the user of a first transmission path along which communications are exchanged between the communication server hosting the service and the first communication device. The communication terminal may then send a survivability registration message to the server via a second transmission path that traverses a second network so that server in response to receipt of the survivability registration message, replaces an initial route set for the first communication device with a survivability route set. The initial route set may define an initial route path that includes the first transmission path and the survivability route set may define a survivability route path that includes the second transmission path.

The computer readable medium may be a hard drive, a flash memory drive or other computer readable medium. The memory may be any type of memory that permits a processor unit of a communication terminal to communicate therewith to execute the program code of the application, for example.

In one embodiment, the method may also include the step of the communication terminal sending a survivability notification to the first communication device. For instance, the application may have program code that is configured to permit the communication terminal to be configured to function as both a survivability proxy and a survivability gateway when executing the program code of the application.

A communication terminal is also provided. The communication terminal may include memory having an application stored thereon, at least one transceiver unit, and at least one processor unit. The at least one processor unit may be communicatively coupled to the one or more transceiver units and memory. The processor unit may be communicatively coupled to the memory such that it can execute the application and perform a method defined by the application. That method may the step of one of: (a) the communication terminal determining a failure of a first network occurred that affects the use of a first transmission path along which communications are exchanged between a communication server that hosts a service and a first communication device and (b) the communication terminal receiving a survivability notification indicating that the failure of the first network occurred that affects the user of a first transmission path along which communications are exchanged between the communication server hosting the service and the first communication device. The communication terminal may then send a survivability registration message to the server via a second transmission path that traverses a second network so that server in response to receipt of the survivability registration message, replaces an initial route set for the first communication device with a survivability route set. The initial route set may define an initial route path that includes the first transmission path and the survivability route set may define a survivability route path that includes the second transmission path.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred devices, systems, and apparatuses for providing communications between multiple communication devices are shown in the accompanying drawings and certain present preferred methods of practicing the same are also illustrated therein. It should be understood that like reference numbers used in the drawings may identify like components.

FIG. 6 is a flow chart illustrating a method of using an exemplary communication system. An optional step of the method shown in FIG. 6 is illustrated in a box outlined by broken lines.

DETAILED DESCRIPTION OF PRESENT PREFERRED EMBODIMENTS

Figure 1:
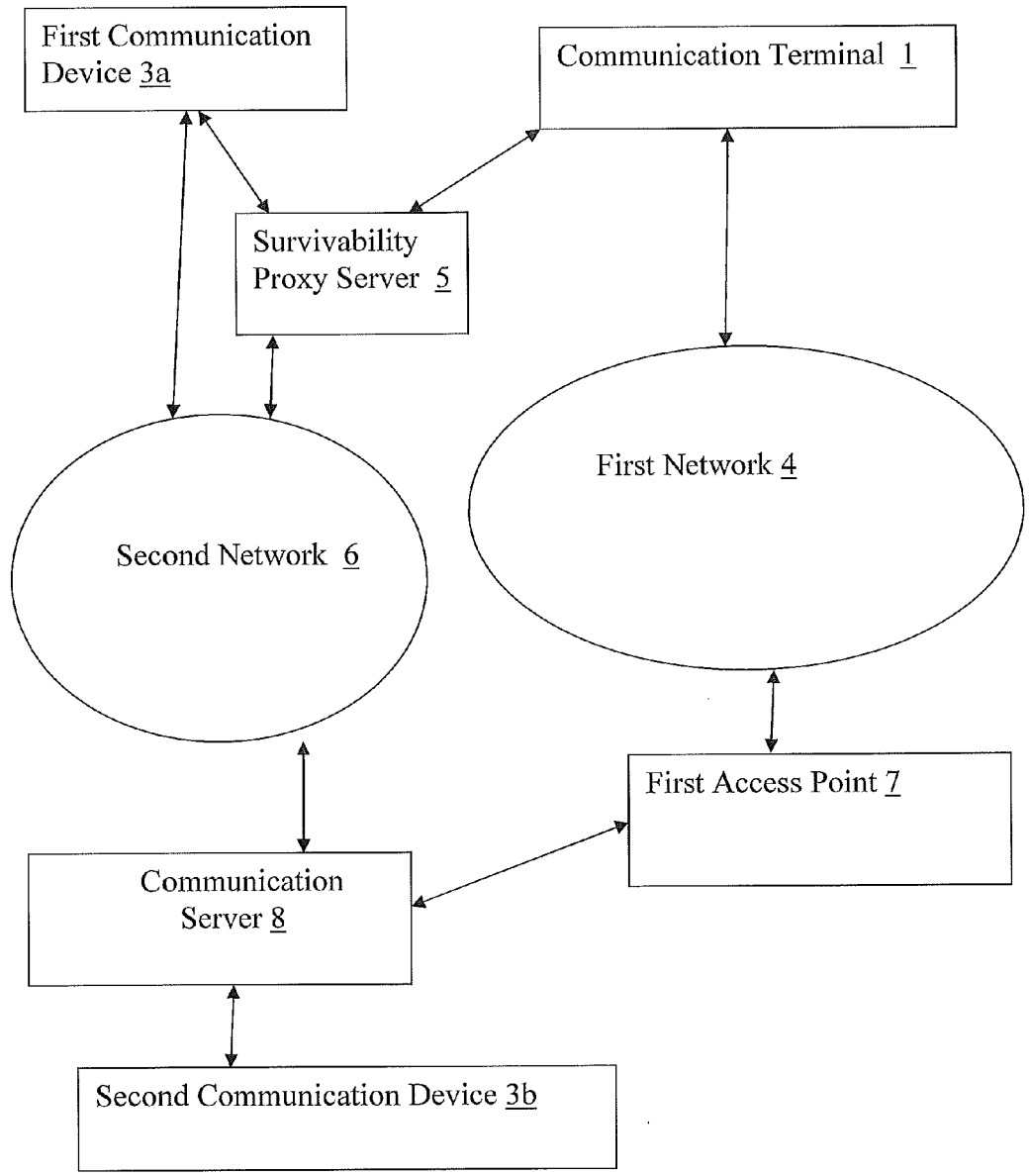
FIG. 1 is a block diagram of a first exemplary embodiment of a communication system.

Referring to FIGS. 1-7, a communication system may include a first communication device 3a and a second communication device 3b that are able to establish a communication session via a first network 4 and via a second network 6 as discussed more fully below. A communication session may be one or more of a phone call, a video phone call, a teleconference call, or a video teleconference call, an instant messaging communication session, a desktop sharing session, or a text messaging communication session, for example. The first network 4 may be a cellular network and the second network 6 may be a communication network that is a wide area network ("WAN") or a local area network ("LAN"). The first network 4 may include a first access point 7 that a communication server 8 communicates with for communication sessions to be established and maintained between the first communication device 3a and the second communication device 3b via a communication path utilizing the first network 4. The first access point 7 may be, for example, a border element of the first network 4 such as a session border controller, a router or base station. It should be appreciated that the communication server 8 hosts a communication service utilized by the first and second communication devices for establishing and engaging in the communication session.

It should be understood that a LAN is a computer network that interconnects computers in a limited area such as a home, school, computer laboratory, or office building. The communication devices 3a and 3b may be IP phones, PC phones, computers having microphones, speakers, a headset, or a camera sensor peripheral device connected thereto for engaging in communication sessions, computers or laptop computers with no peripheral devices attached or only one or some combination of peripheral devices attached for engaging in a voice communication, video communication, text messaging communication, instant messaging communication or other type of communication session. It should also be understood that a WAN is a computer network spanning regions, countries, or even the world used to transmit data over long distances such as, for example, between different LANs. The WANs and LANs may utilize wired connections, wireless connections, or a combination of both wireless and wired communication connections.

It should additionally be understood that a cellular network is a radio network distributed over land areas called cells that are each served by at least one fixed-location transceiver often referred to as a cell site or base station. When joined together the cells of the cellular network provide radio coverage over a wide geographic area, which can enable a large number of portable mobile communication terminals (e.g., mobile phones, pagers, tablets, smart phones, etc.) to communicate with each other and with fixed communication devices such as computers, PC phones, IP phones, and telephones anywhere in the network via the base stations even if some of the mobile communication terminals are moving through more than one cell during transmission.

The first communication device 3a and second communication device 3b may be able to establish a first communication session, such as a telephone call, by communications exchanged using a transmission path that only passes through the second network 6. For instance, the second communication device 3b may communicate with the communications server 8 that hosts the communication service, which may be for example an SIP server, so signaling for initiating the phone call may be sent via the second network 6 to the first communication device 3a via a first communication path. The first communication device 3a may receive messages from the second communication device 3b via the communication server 8 forwarding such messages to it via the second network 6 and may also send messages to the second communication device 3b via the communication server 8. Of course, the second communication device 3b may also receive the messages sent to it by the first communication device 3a via the communication server 8 forwarding such sent messages to the second communication device 3b.

The transmission of communication messages between the first and second communication devices 3a and 3b via the communication server 8 may only pass through a first communication transmission path, which may be entirely within the second network 6. The first communication device 3a may receive messages sent by the second communication device 3b via the communication server 8 forwarding such messages via the second network 6. The second communication device 3b may receive messages sent by the first communication device 3a via the communication server 8 forwarding such messages received via the first communication transmission path, which only passes through the second network 6, to the second communication device 3b.

It should be understood that the first communication transmission path may include one or more access points of the second network 6. For instance, an access point (not shown) may receive data for sending to the first communication device 3a and may receive data from the first communication device 3a for forwarding through the second network to the second communication device 3b.

The first and second communication devices 3a and 3b may each have to register with the communication server 8 that hosts the communication service prior to utilizing the service hosted by the communication server 8. Each communication device may register using a similar process. The registration process discussed above will utilize the first communication device 3a as an exemplary illustration of this process. Nevertheless, it should be understood that the second communication device 3b may utilize the same process for registration with the communication server 8.

To utilize the communication service hosted by the communication server 8, a user of a number of communication devices such as the first communication device 3a and a communication terminal 1, which may be for example, a cellular phone, tablet, or small phone configured to communicate via the first network 4. The user may provide input to the communication terminal 1 and the first communication device 3a to register those devices with a survivability proxy. The survivability proxy may be a server or a software service (e.g. a "SW service") and may function similar to the survivability servers disclosed in International Patent Application No. PCT/US12/24831, which was filed on Feb. 13, 2012 and is entitled "Apparatus and Mechanism for Dynamic Assignment of Survivability Services to Mobile Devices." The survivability proxy may also be assigned to the user's communication devices similar to how survivability servers are disclosed as being assigned in International Patent Application No. PCT/US12/24831. The entirety of International Patent Application No. PCT/US12/24831 is incorporated herein by reference.

The first communication device 3a may be a communication device that has a client stored in memory of the device that may be run by a processor unit of the device to initiate use of the communication service hosted by the communication server 8. The client may be, for example, software stored on the memory of the communication device that is executed by the processor unit of the communication device. Of course, the communication device may have one or more transceivers for sending and receiving data to and from the device to other devices.

The first communication device 3a may authenticate itself with the communication server 8 that hosts the communication service in an initial communication with the communication server 8. The initial communication may be an authentication communication that includes account information from a user associated with the first communication device 3a. The account information may include a user name, password, and other information defined by user input or provisioning service that was provided to the first communication device 3a and stored in the memory of the first communication device 3a.

The initial communication sent by the first communication device 3a may also include current location information that identifies a current location of the first communication device 3a. The current location information provided in the initial communication may include, for example, an IP address of the first communication device 3a, a Media Access Control ("MAC") address of the first communication device 3a, a nanowire ("NW") address of the first communication device 3a, a civic address of the first communication device 3a, a Location Identification Number of the first communication device 3a, a location domain obtained via a Dynamic Host Configuration Protocol ("DHCP"), a current location determined via a location finding mechanism such as a global positioning system ("GPS") or other location identifying mechanism. In some embodiments, the first communication device 3a may be configured so that it transmits all the information provided in the initial communication 3 by a user pressing one button or via actuation of a single icon shown on a touch screen display of the first communication device 3a. Alternatively, the first communication device 3a may be configured to automatically initiate the initial communication once the account information of the user is available.

The communication server 8 may receive the initial communication from the first communication device 3a and use Call Admission Control ("CAC") policies to determine the survivability server or survivability proxy corresponding to the current location of the first communication device 3a identified within the initial communication. Upon authentication of at least the sign-in information of the user account information in the initial communication, the communication server 8 may send a response message to the first communication device 3a that includes an assignment to a survivability server associated with providing coverage for the area that includes the current location of the first communication device 3a, such as the survivability proxy server 5. That area may be due to a physical location of the first mobile device or due to the address of the first mobile device in accordance with the location information included in the initial communication. The assignment of the survivability proxy server 5 may not require any user input and may be automatic upon receipt of the initial communication such that the assignment of the first survivability server proxy 5 to the first communication device 3a is a dynamic and automatic assignment.

In some embodiments, the survivability proxy server 5 may be included in an access point to which the first communication device 3a communicates for using transmission paths that traverse the second network 6 or may be a separate computer device that monitors the state of the second network 6 to assess whether an outage may occur that affects services being rendered to the first communication device 3a via the second network 6. For example, the survivability proxy server 5 may be a server that communicates with one or more network nodes of the second network to assess whether a network outage has occurred that can impact services available to the first communication device 3a. The one or more network nodes may include one or more access points of the second network and may also include other network nodes such as intermediary nodes, bandwidth managers, or servers of the network that monitor or provide communication paths along which communication messages may travel to or from the first communication device 3a within the second network 6.

Figure 2:
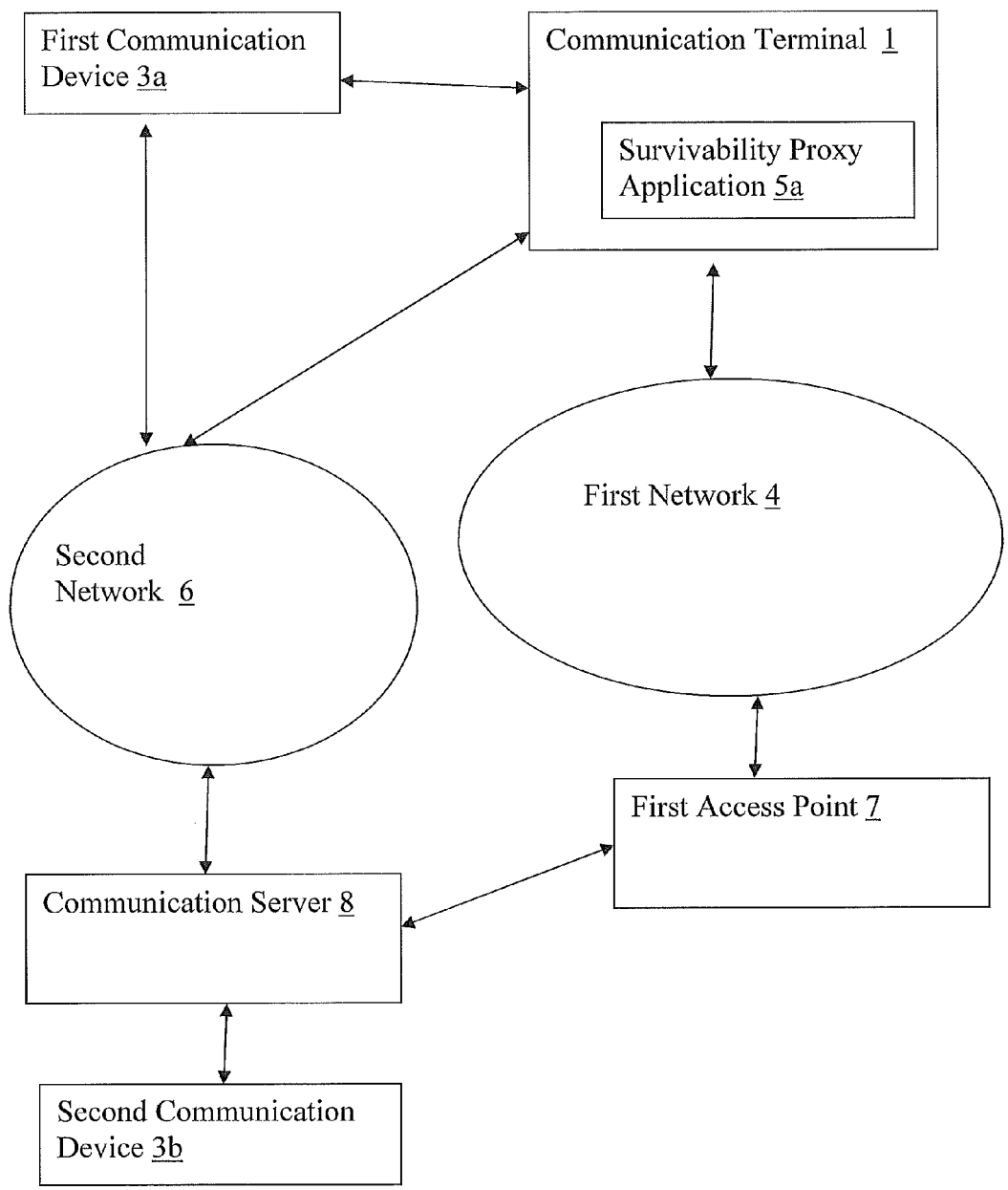
FIG. 2 is a block diagram of a second exemplary embodiment of a communication system.
Figure 7:
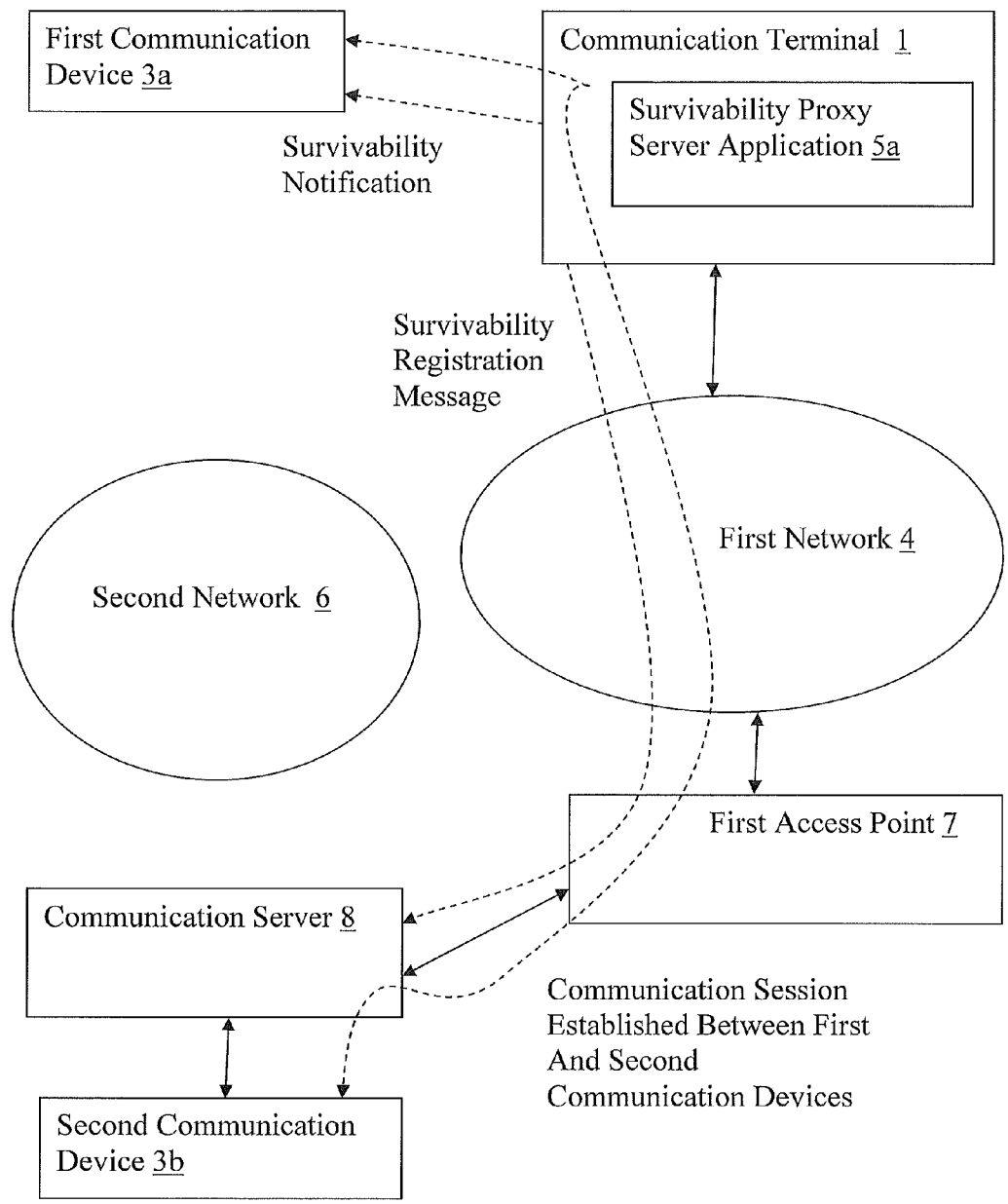
FIG. 7 is a block diagram of the second exemplary embodiment of a communication system illustrating messaging and communication session routing that may occur upon a detection of a network outage of the second network 6 affecting a registered device.

In alternative embodiments, the survivability proxy server may be executed as a survivability proxy application 5a that is executed by the processor unit of a user's communication terminal 1 so that the user's communication terminal provides a survivability server functionality as may be appreciated from FIGS. 2 and 7. For example, the assignment of the survivability proxy server may be to a device having survivability proxy server application 5a stored thereon that is already registered with the communication service hosted by the communication server 8, as may be appreciated from an alternative system illustrated in FIG. 2. Such an application may be stored on a communication terminal 1, which may be another communication device that is associated with the user of the first communication device 3a that was previously registered with the communication server 8 and has an application stored thereon that is executed by the communication terminal 1 so that the communication terminal 1 may function as a survivability proxy.

The communication terminal 1 having such survivability proxy functionality may be assigned by the communication server 8. For instance, the communication server 8 may make such an assignment by determining which other communication device associated with the user and was already registered with the communication server is located nearest to the first communication device. That nearest such device may then be assigned as the survivability proxy server for the first communication device 3a. Alternatively, a user may have provided input to the communication server 8 via a prior registered device sending a message to the communication server 8 that includes information identifying which device associated with the user should be assigned as a survivability proxy for other devices associated with the user and the communication server 8 may save such data and assign that device in accordance with the received user input in response to the initial communication received by the first communication device 3a. The included information may identify a particular device as having the survivability proxy server application 5a for example, or may be a message sent by the device having such an application installed thereon during an installation of the application on that device.

One example of an assignment of a survivability proxy would be to dynamically assign an appropriate outbound survivable Session Initiation Protocol ("SIP") proxy for a SIP user agent running in the first communication device 3a. The sign-in step to the service could occur via the initial communication by a SIP SUBSCRIBE/NOTIFY exchanged with an XML body containing the configuration data of the communication device. The SUBSCRIBE message would be the initial communication and the NOTIFY message would be the response communication sent by the communication server 8. It should be understood that the assigned SIP proxy would depend upon the SIP user agent current location identified in the current location of the initial communication 3, a CAC policy defined for this location that defines the SIP proxy for this identified location, and/or any information or user input defining the device that should function as the assigned SIP proxy. The lookup for the CAC policy and assignment of the SIP proxy to the SIP user agent of the first communication device 3a could be performed by the communication server 8 and could occur in response to receipt of sign-in information via the initial communication sent by the first communication device 3a.

After the response communication from the communication server 8 is received by the first communication device 3a, the first communication device 3a may register itself with the communication service hosted by the communication server 8 and also the survivability proxy server that was assigned to the first communication device 3a as communicated in the response communication. The first communication device 3a may send a first registration message to the communication server 8 and a second registration message to the survivability proxy to achieve such registration. If SIP protocol is used in the system, a SIP REGISTER request may be such registration messages.

Alternatively, the survivability proxy may be used as an outbound proxy by an SIP user agent of the first communication device 3a. In this case, the SIP user agent registers with the survivability proxy and the survivability proxy relays the registration to the communication server. For instance, the first communication device 3a may send a registration message to the survivability proxy, which may be survivability proxy server 5 or communication terminal 1 having a survivability proxy application 5a running thereon to register with that device. That proxy device may then also relay the registration to the communication server 8 to effect registration with the communication server 8 either by forwarding the registration message or sending a new message generated by the proxy device to the communication server 8 that includes registration information for registering the first communication device 3a.

Upon registration, the survivability proxy (e.g. either survivability proxy server 5 or communication terminal 1 having a survivability proxy server application 5a running thereon) may have the user account information and other information related to the user's identify for use in providing communication services in the event of a communication failure that could impact communication services hosted by the communication server 8.

It should be understood that the registration of the first communication device 3a with the communication server 8 results in the communication server defining registration bindings for the first communication device 3a. The registration bindings may include defining a route set or portion of a route set the communication server 8 will use for sending data or forwarding data to the registered first communication device 3a. The registration bindings for example may be defined by a route set included within the registration message that is ultimately received by the communication server 8 from the first communication device 3a, which includes an indication of intermediate nodes along which the message was forwarded through the second network 6 prior to being received by the communication server 8.

A user may also register other communication devices with the communication server 8. One such communication device may be a communication terminal 1 that includes an application that permits the communication terminal 1 to be configured to provide gateway services to other devices. The presence of such an application may be communicated to the communication server 8 during the registration process or after the registration process. The presence of such an application 37 that permits the communication terminal 1 to function as a gateway may alternatively be communicated by the device directly to a survivability proxy assigned to that device. Such functionality may be identified by including indicia in the header of an SIP registration message or by including information in a SIP header attribute of an SIP message sent to the proxy or communication server 8 during or after registration of the communication terminal 1 having such functionality. If the communication server 8 learns of such a registered device having gateway functionality, the communication server 8 may send a message to the survivability proxy assigned to that device and any other devices assigned to the user of this device identifying the registered device as a survivability gateway for use in the event a network failure is detected that affects the use of the services hosted by the communication server 8. As may be appreciated from FIGS. 2 and 5, some embodiments may utilize a communication terminal 1 that has a gateway application 37 as a survivability proxy that includes a survivability proxy application 5a that is executed by a processor unit of the communication terminal 1.

Figure 3:
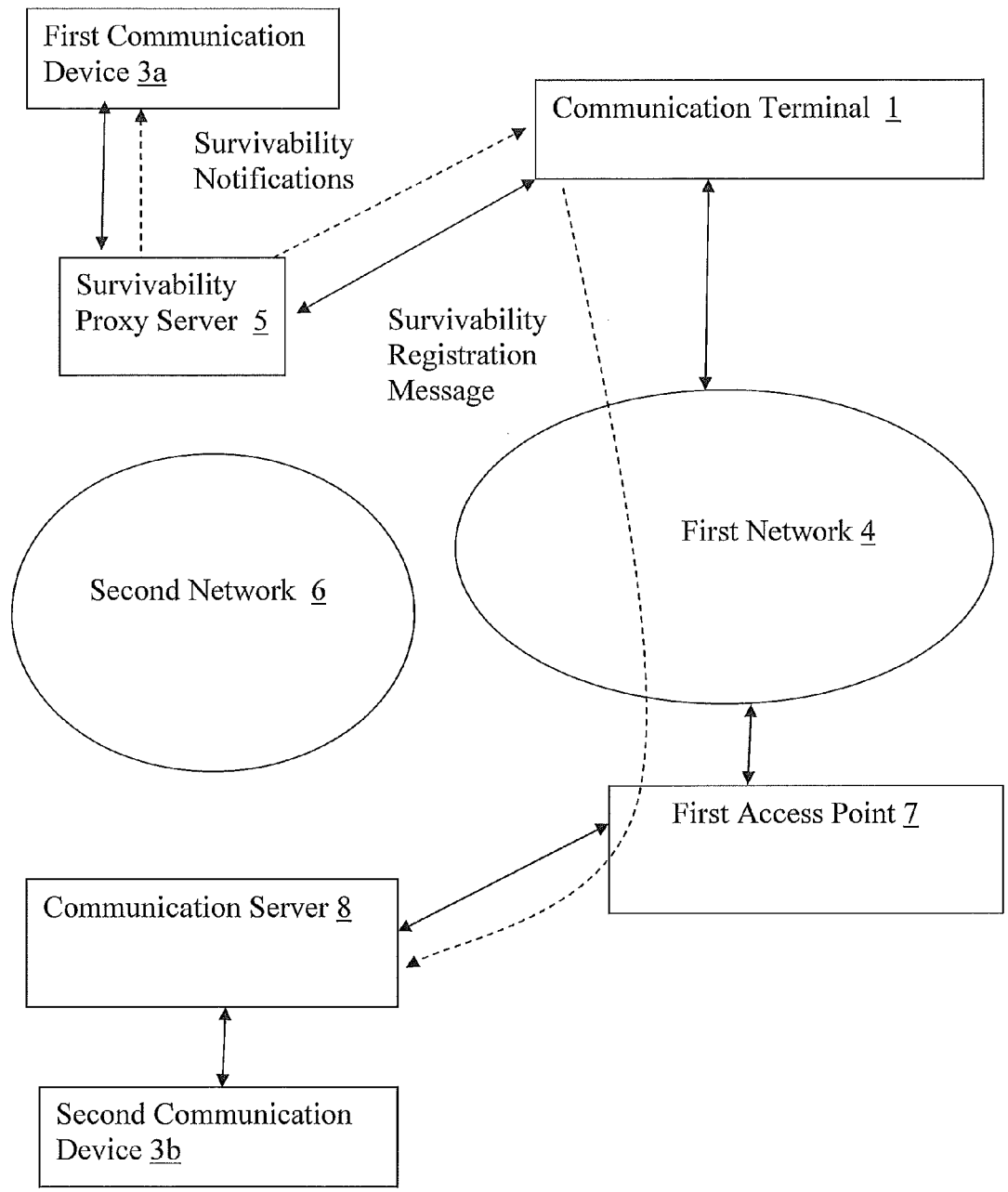
FIG. 3 is a block diagram of the first exemplary embodiment of a communication system illustrating messaging that may occur in response to a detected network outage occurring with the second network 6.
Figure 4:
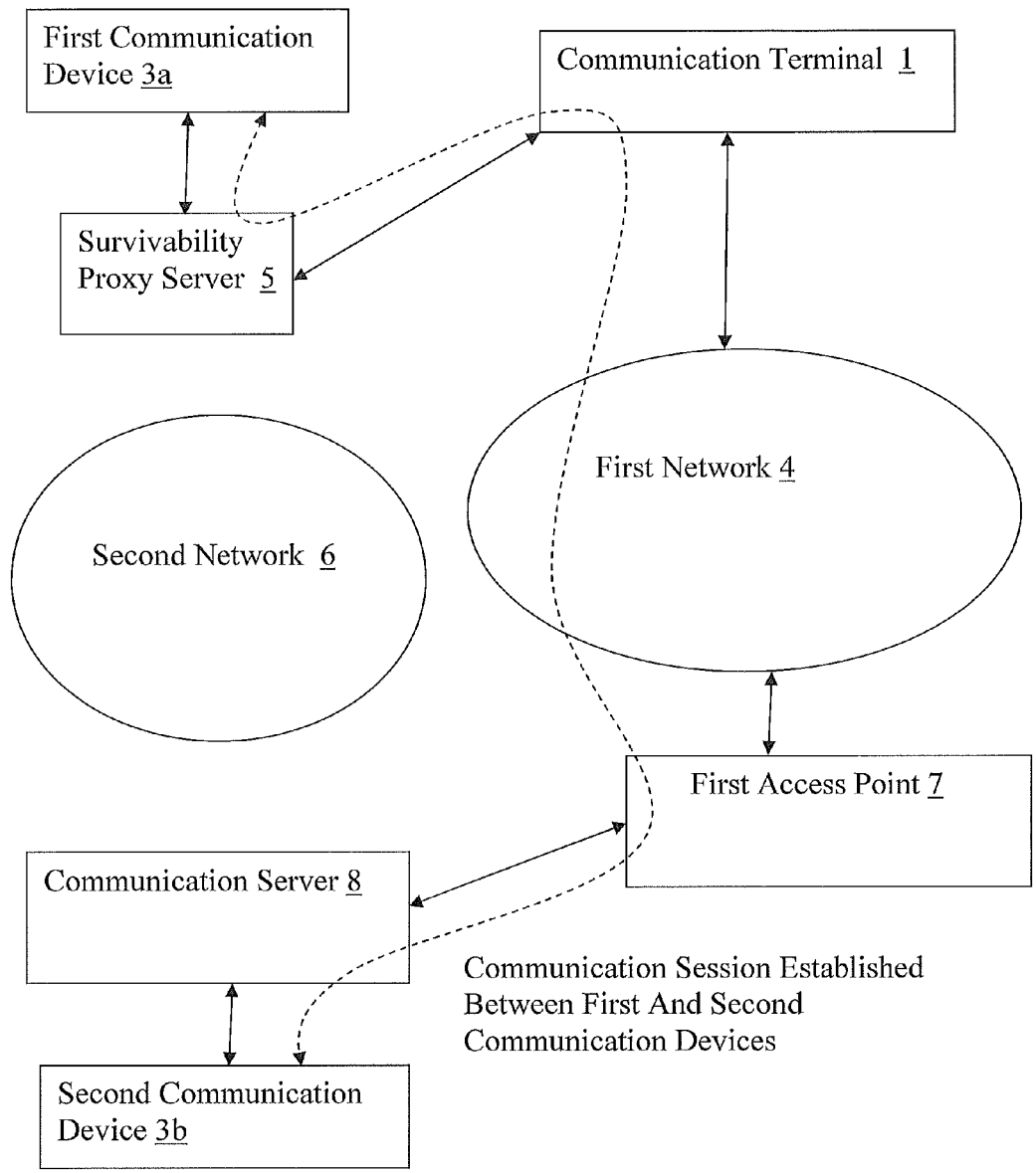
FIG. 4 is a block diagram of the first exemplary embodiment of a communication system illustrating messaging and communication session routing that may occur upon a detection of a network outage of the second network 6 affecting a registered device.
Figure 5:
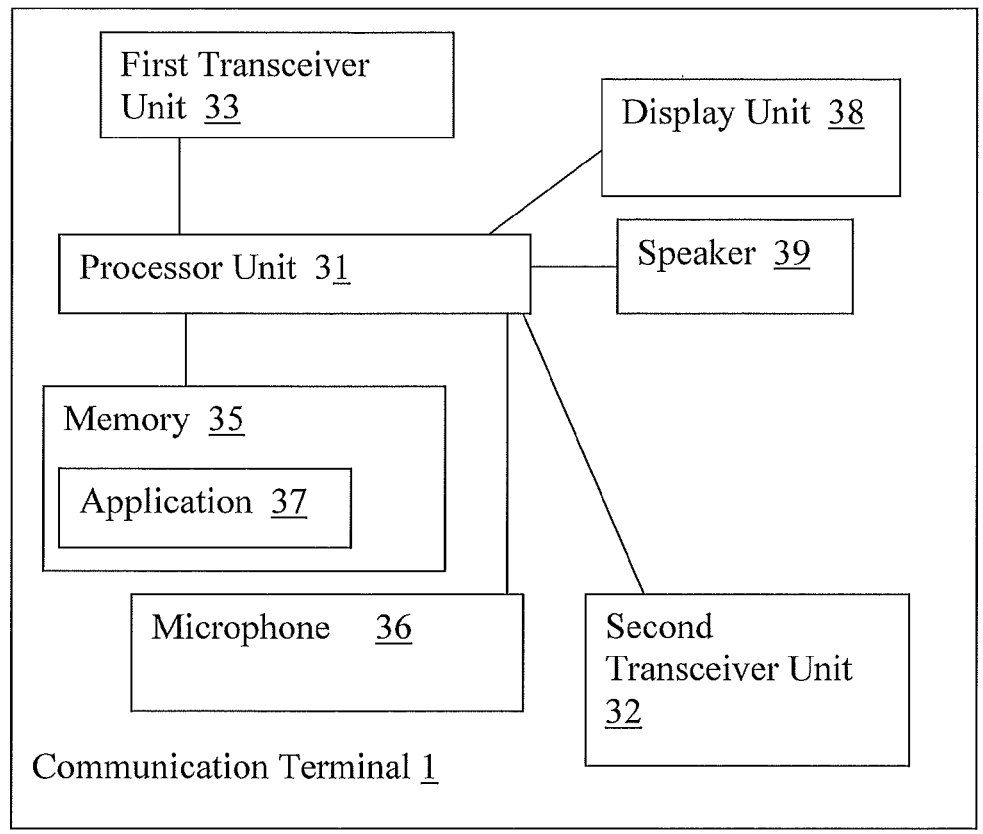
FIG. 5 is a block diagram illustrating an exemplary embodiment of a communication terminal that may provide survivability gateway services.

An example of a communication terminal 1 having survivability gateway functionality may be understood from FIG. 5. The communication terminal 1 may include a first transceiver unit 33 for communicating with the first network 4, such as a transceiver unit for cellular network communications. The communication terminal 1 may also include a second transceiver unit 32 for communicating with another network or other device, such as a survivability proxy server 5 as shown in FIGS. 1 and 3-4 or with a communication device associated with the user of the communication terminal 1 such as the first communication device 3a. The first and second transceiver units may be communicatively connected to the processor unit 31 of the communication terminal 1 such that the terminal may send and receive data packets or messages. The communication terminal 1 may also include memory 35 that is communicatively coupled to the processor unit 31. The memory may include an application such as a survivability proxy server application 5a and may also include a gateway application such as application 37. In some embodiments where the communication terminal is also configured to provide survivability proxy server functionality, the gateway application 37 may be a subpart of a survivability proxy server application 5a or the survivability proxy server application 5a may be a subpart of the gateway application 37. Of course, the communication terminal may also include one or more input devices and output devices communicatively coupled to the processor unit such as a microphone 36, display unit 38 and speaker 39. The display unit 38 may be a touch screen display unit. Of course, other input or output devices may also be communicatively coupled to the processor unit 31 of the communication terminal 1 such as a keyboard or buttons.

It should be appreciated that the gateway application 37 may be an application that has program code executable by the processor unit 31 of the communication terminal 1. The program code may define a method executed by the communication terminal 1 when the communication terminal 1 executes the program code of the application. The method may include any of the number of steps discussed above and also discussed below that the communication terminal 1 may take to function as a survivability gateway as well as steps the communication terminal 1 may take as a survivability proxy when the communication terminal is configured to function as both the survivability proxy and survivability gateway. One example of the communication terminal only acting as a survivability gateway may be seen from FIGS. 3-4 and an example of the communication terminal 1 functioning as both a survivability gateway and survivability proxy may be seen in FIG. 7.

When the survivability proxy (e.g. survivability proxy server 5 or communication terminal 1 executing the survivability proxy server application 5a) detects a network failure in the second network 6 that affects communications to the first communication device 3a that has registered with the communication service hosted by the communication server 8, the survivability proxy notifies the first communication device 3a and communication terminal 1 registered therewith of this event by sending survivability notifications of the communication failure to the first communication device 3a. A network failure may be an equipment failure or damage to one or more network nodes of the second network 6 or may be some other occurrence that changes a status of service or quality of service associated with the communication service hosted by the communication server 8 to be below a predetermined threshold value utilizing the communication transmission path the first communication device 3a uses for communicating with the communication server 8.

The survivability notification sent by the survivability proxy may provide information or indicia that indicates a failure to the second network has occurred that affects the service hosted by the communication server 8 for data traffic passing through the second network 6 to or from the first communication device 3a as part of communications being exchanged for utilization of the service hosted by the communication server 8. The survivability proxy may detect the failure in the second network by monitoring the state of service of the second network 6, receiving one or more messages from different network nodes of the second network 6 or by receiving a message from the communication server 8 sent via the first network 4 advising the proxy of the failure.

As may appreciated from FIGS. 3 and 6, in response to determining that a communication failure has impacted the communication service of different communication devices associated with a user of the communication terminal 1, the communication terminal 1 that has the gateway application 37 determines that survivability services must be rendered for the affected user communication devices and sends a survivability registration message via the first network 4. The registration message may traverse one or more cells of the first network 4 and additionally be received and forwarded by the first access point 7 so that the survivability registration message is received by the communication server 8 hosting the communication service via a second communication transmission path. It should be appreciated that the first access point 7 may be a border element such as a router or base station that provides the communication service 8 with access to the first network 4.

The survivability registration message may include information identifying one or more of the communication devices registered with the communication server 8 hosting the service that is associated with the user of the communication terminal 1 or first communication device 3a. The survivability registration message may also include information indicating to the communication server 8 that those identified devices need their registration bindings that the communication server uses for forwarding or sending data to the registered devices used for engaging in a communication service hosted by the communication server 8 to be temporarily replaced due to a network communication failure. In response to receipt of the survivability registration message, the communication server 8 may replace the registration bindings for each so identified user device, such as the first communication device 3a and replace that binding with a route set identified in the forwarded survivability registration message received by the communication server 8.

The survivability route set provided to the communication server 8 may define the route along which the survivability registration message traveled from the communication terminal 1 to the communication server 8. Such a message may include information appended or added to the survivability registration message by network elements of the first network 4 and the first access point 7 to identify the route along which a message may be sent by the communication server 8 to the first communication terminal 1. In some embodiments, only one survivability registration message may be sent by the communication terminal 1 that identifies all of the communication devices associated with a user that are affected by a network failure and require a temporary change to registration bindings for each such device. In alternative embodiments, one such message may be sent by the communication terminal 1 for each respective communication device affected by such a network failure.

The communication server 8 may also store the prior bindings replaced in response to the receipt of a survivability registration message for each communication device affected by that message so that after the network failure of the second network 6 is resolved, the communication server 8 may delete the temporary survivability route and replace it with the prior registration bindings so that the registered communication device does not have to re-register with the communication server 8. The communication server 8 may learn of the survivability mode no longer being needed by receiving a message from the communication terminal 1 identifying the fact that the survivability mode for one or more of the communication devices is no longer needed.

After the survivability registration message is received by the communication server 8 and the communication server replaces the bindings for the first communication device 3a with the survivability bindings provided via the survivability registration message received from the communication terminal 1, the communication server 8 may send messages to the first communication device 3a that bypass the second network 6 and instead uses the new survivability route, which defines a communication path that includes a path that only passes through the first network 4. Such messages may relate to a communication session that is to be established between the second communication device 3b and the first communication device 3a as indicated in FIGS. 4 and 7, for example. Of course, the messages may relate to other communication sessions involving other devices or may relate to a periodic update message or other message that may originate from the communication server 8 for sending to the first communication device 3a.

The communication terminal 1 may receive such messages sent via the survivability route that passes through the first network 4 and forward those messages to a survivability proxy server 5 for forwarding to the first communication device 3a as may be appreciated from FIG. 5. In the alternative, if the communication terminal 1 also is running a survivability proxy server application 5a, the communication terminal may directly forward the message to the first communication device 3a as may be appreciated from FIG. 7. Such transmission paths may utilize a wireless connection such as a Bluetooth connection or a wireless network connection that is hosted by the communication terminal 1 or survivability proxy server 5 such as a wireless local area network hosted by the survivability proxy server 5 or communication terminal 1 or hosted by a router communicatively connected to the communication terminal 1 or survivability proxy server 5.

Referring to FIG. 5, in some embodiments of the communication system, the communication terminal 1 may utilize a first transceiver 33 for sending and receiving messages via the first network 4 and may utilize a second transceiver 32 for sending and receiving messages to and from the first communication device 3a or survivability server proxy 5.

It should be appreciated that there are a number of variations that may be made to the embodiments of our communication terminal, communication system, and methods of making and using the same discussed above. For instance, the communication terminal 1 may be a tablet, cellular phone, laptop computer, personal digital assistant, or other mobile computer device and the first and second communication devices 3a and 3b may each be a telephone, PC telephone, or desktop telephone. The survivability server proxy 5 may be a server or may be a router or other access point that utilizes a processor that is communicatively coupled to memory that has a survivability server proxy application stored thereon that is executed by the router. As yet another example, the first network 4 may be a cellular network or other network maintained by cellular phone network service provider and the second network may be a WAN or a LAN such as an enterprise network operated or maintained by a business or governmental entity.

While certain present preferred embodiments of the communication terminal, communication system, and methods of making and using the same have been shown and described above, it is to be distinctly understood that the invention is not limited thereto but may be otherwise variously embodied and practiced within the scope of the following claims.

What is claimed is:

1. A communication system comprising:
a first communication device;
a communication server hosting a communication service;
a first network communicatively connectable to the communication server;
a second network communicatively connectable to the communication server;
the first communication device communicatively connectable to the communication server to utilize the server via a first transmission path that passes through the second network; and a survivability proxy device communicatively connectable to the communication server, communicatively connectable to the second network and communicatively connectable to the first communication device; and the first communication device registering with at least one of the survivability proxy device and the communication server such that the first communication device utilizes the communication service hosted by the communication server by exchanging communications with the communication server via a first transmission path, a first transmission path traversing the second network;

the survivability proxy device determining that the second network experienced a failure such that the first communication device is unable to utilize the second network for utilization of the communication service hosted by the communication server;

the survivability proxy device sending a survivability notification to at least one of the first communication device and a survivability gateway device assigned to the first communication device;

one of the survivability proxy device and survivability gateway device sending a survivability registration message to the communication server via a second transmission path that traverses the first network;

in response to receipt of the survivability registration message, the communication server replacing an initial route set for the first communication device that defines an initial route path comprising the first transmission path along which the communication server sends communications to the first communication device with a survivability route set identified by the received survivability registration message, the survivability route set defining a survivability route path comprising the second transmission path.

2. The system of claim 1 wherein the communication server is a Session Initiation Protocol ("SIP") server.

3. The system of claim 1 wherein the first communication device is unable to utilize the second network for utilization of the communication service hosted by the communication server by the failure of the second network creating change in a status of service or quality of service associated with the communication server to be below a predetermined threshold value.

4. The system of claim 1 wherein the survivability proxy device is a communication terminal associated with a user who is also associated with the first communication device, the communication terminal communicatively connectable to the first network to communicate with the communication server via the second transmission path.

5. The system of claim 4 wherein the survivability gateway device is the communication terminal.

6. The system of claim 1 wherein the survivability gateway device is a communication terminal communicatively connectable to the first network to communicate with the communication server via the second transmission path and also communicatively connectable to the survivability proxy device.

7. The system of claim 1 wherein the communication server sends messages to the first communication device via the second transmission path and received messages from the first communication device via the second transmission path after replacing the initial route set with the survivability route set.

8. The system of claim 1 wherein the survivability proxy device sends the survivability registration message to the communication server via the second transmission path that traverses the first network and wherein the survivability proxy device is a communication terminal associated with a user of the first communication device that is comprised of a processing unit communicatively coupled to at least one transceiver unit and a non-transitory memory and wherein the communication terminal is a survivability gateway for the first communication device after the failure of the second network is determined to have occurred.

9. The system of claim 1 wherein the survivability gateway device assigned to the first communication device receives the survivability notification and the survivability gateway device sends the survivability registration message to the communication server via the second transmission path that traverses the first network.

10. The system of claim 9 wherein the survivability gateway device is a communication terminal associated with a user of the first communication device.

11. The system of claim 10 wherein the communication terminal is a tablet, a cellular phone, a personal digital assistant, or a laptop computer device, wherein the first communication device is a desktop computer, a laptop computer, a tablet, an internet appliance, a telephone, or a PC telephone, wherein the first network is a cellular network and wherein the second network is a wide area network or a local area network.

12. The system of claim 10 wherein the survivability gateway device receives a communication session related message from the communication server via the second transmission path that is for receipt by the first communication device and forwards that communication session related message to the survivability proxy device and the survivability proxy device receives the forwarded communication session related message and forwards the received forwarded communication session related message to the first communication device.

13. The system of claim 1 wherein the survivability proxy device sends the survivability registration message to the communication server via the second transmission path that traverses the first network and wherein the survivability proxy device receives a communication session related message from the communication server via the second transmission path that is for receipt by the first communication device and forwards that communication session related message to the first communication device.

14. The system of claim 1 wherein the survivability proxy device sends the survivability registration message to the communication server via the second transmission path that traverses the first network and wherein the survivability proxy device receives a communication session related message from the first communication device that relates to the communication service hosted by the communication server and forwards the communication session related message via the second transmission path to the communication server.

15. The system of claim 1 wherein the survivability gateway device assigned to the first communication device receives the survivability notification and wherein the survivability gateway device is a communication terminal; and wherein prior to the survivability proxy device determining that the second network experienced the failure:

the communication terminal registering with the communication server via exchanging at least one message with the communication server via the second network, and the communication server assigning the communication terminal as a survivability gateway for the first communication device by:

(a) the communication server determining that the communication terminal has survivability gateway functionality, (b) the communication server determining that a user associated with the communication terminal is also the user associated with the first communication device, and (c) the communication server sending a message to the survivability proxy device via the second network identifying the communication terminal as the survivability gateway for the first communication device such that the survivability proxy device sends the survivability notification to the survivability gateway device.

16. A method for providing a survivability service for a communication service comprising:

a first communication device registering with at least one of a survivability proxy device and a communication server such that the first communication device utilizes a communication service hosted by the communication server by exchanging communications with the communication server via a first transmission path, the first transmission path traversing a first network;

the survivability proxy device determining that the first network experienced a failure such that the first communication device is unable to utilize the first network for utilization of the communication service hosted by the communication server;

the survivability proxy device sending a survivability notification to at least one of the first communication device and a survivability gateway device assigned to the first communication device;

one of the survivability proxy device and survivability gateway device sending a survivability registration message to the communication server via a second transmission path that traverses a second network;

in response to receipt of the survivability registration message, the communication server replacing an initial route set for the first communication device that defines an initial route path comprising the first transmission path along which the communication server sends communications to the first communication device with a survivability route set identified by the received survivability registration message, the survivability route set defining a survivability route path comprising the second transmission path.

17. The method of claim 16 wherein the survivability proxy device sends the survivability registration message to the communication server via the second transmission path that traverses the second network and wherein the survivability proxy device is a communication terminal associated with a user of the first communication device that is comprised of a processing unit communicatively coupled to at least one transceiver unit and a non-transitory memory and wherein the communication terminal is a survivability gateway for the first communication device after the failure of the first network is determined to have occurred.

18. The method of claim 16 wherein the survivability gateway device assigned to the first communication device receives the survivability notification and the survivability gateway device sends the survivability registration message to the communication server via the second transmission path that traverses the second network.

19. The method of claim 18 wherein the survivability gateway device is a communication terminal associated with a user of the first communication device and the method further comprising:

the survivability gateway device receiving a communication session related message from the communication server via the second transmission path that is for receipt by the first communication device;

the survivability gateway device forwarding the communication session related message to the survivability proxy device; and the survivability proxy device receiving the forwarded communication session related message and forwarding the received forwarded communication session related message to the first communication device.

20. The method of claim 16 wherein the survivability proxy device sends the survivability registration message to the communication server via the second transmission path that traverses the second network and the method further comprising:

the survivability proxy device receiving a communication session related message from the communication server via the second transmission path that is for receipt by the first communication device; and the survivability proxy device forwarding the communication session related message to the first communication device.

21. The method of claim 16 wherein the survivability proxy device sends the survivability registration message to the communication server via the second transmission path that traverses the second network and the method further comprising:

the survivability proxy device receiving a communication session related message from the first communication device that relates to the communication service hosted by the communication server; and the survivability proxy device forwarding the communication session related message via the second transmission path to the communication server.

22. The method of claim 16 wherein the survivability gateway device assigned to the first communication device receives the survivability notification and wherein the survivability gateway device is a communication terminal; and wherein prior to the survivability proxy device determining that the first network experienced the failure:

the communication terminal registering with the communication server via exchanging at least one message with the communication server via the first network;

the communication server determining that the communication terminal has survivability gateway functionality, the communication server determining that a user associated with the communication terminal is also the user associated with the first communication device, and the communication server assigning the communication terminal to the first communication device as a survivability gateway for the first communication device; and the communication server sending a message to the survivability proxy device via the first network identifying the communication terminal as the survivability gateway for the first communication device such that the survivability proxy device sends the survivability notification to the survivability gateway device after determining that the first network experienced the failure.

23. A non-transitory computer readable medium having an application stored thereon, the application comprising program code executable by a communication terminal, the program code defining a method executed by the communication terminal when the communication terminal executes the program code, the method comprising:

one of:
- the communication terminal determining a failure of a first network occurred that affects the use of a first transmission path along which communications are exchanged between a communication server hosting a communication service and a first communication device, and
- the communication terminal receiving a survivability notification indicating that the failure of the first network occurred that affects the use of a first transmission path along which communications are exchanged between the communication server hosting the communication service and the first communication device; and the communication terminal sending a survivability registration message to the communication server via a second transmission path that traverses a second network such that the communication server, in response to receipt of the survivability registration message, replaces an initial route set for the first communication device that defines an initial route path comprising the first transmission path along which the communication server sends communications to the first communication device via the first network with a survivability route set identified by the received survivability registration message, the survivability route set defining a survivability route path comprising the second transmission path.

24. The non-transitory computer readable medium of claim 23 wherein the communication terminal determines the failure of the first network occurred that affects use of the communication service hosted by the communication server utilized by the first communication device and wherein the method further comprises:
- the communication terminal sending a survivability notification to the first communication device.

25. A communication terminal comprising:
at least one transceiver unit;
memory having an application stored thereon;
at least one processor unit, the at least one processor unit communicatively coupled to the at least one transceiver unit and the memory, the at least one processor unit communicatively coupled to the memory such that the application is executable by the at least one processor unit such that the communication terminal performs a method defined by the application, the method comprising:

one of:
- the communication terminal determining a failure of a first network occurred that affects the use of a first transmission path along which communications are exchanged between a communication server hosting a communication service and a first communication device, and
- the communication terminal receiving a survivability notification indicating that the failure of the first network occurred that affects the use of a first transmission path along which communications are exchanged between the communication server hosting the communication service and the first communication device; and the communication terminal sending a survivability registration message to the communication server via a second transmission path that traverses a second network such that the communication server, in response to receipt of the survivability registration message, replaces an initial route set for the first communication device that defines an initial route path comprising the first transmission path along which the communication server sends communications to the first communication device via the first network with a survivability route set identified by the received survivability registration message, the survivability route set defining a survivability route path comprising the second transmission path.

* * * * *